United States Patent [19]

Greco et al.

[11] 4,350,612
[45] Sep. 21, 1982

[54] METHOD FOR PREPARING A MAGNESIUM HALIDE SUPPORT FOR CATALYSTS

[75] Inventors: Carl C. Greco, Garnersville, N.Y.; Kelly B. Triplett, Stamford, Conn.

[73] Assignee: Stauffer Chemical Company, Westport, Conn.

[21] Appl. No.: 224,765

[22] Filed: Jan. 13, 1981

[51] Int. Cl.$^3$ .............................. C08F 4/02; C08F 4/64
[52] U.S. Cl. ................................ 252/441; 252/429 B; 252/429 C; 526/125
[58] Field of Search ............... 252/429 B, 429 C, 441; 526/125

[56] References Cited

U.S. PATENT DOCUMENTS

| | | | |
|---|---|---|---|
| 3,953,414 | 4/1976 | Galls et al. | 252/429 B |
| 4,013,823 | 3/1977 | Longi et al. | 252/429 B |
| 4,156,063 | 5/1979 | Giannini et al. | 252/429 B |
| 4,215,013 | 7/1980 | Loontjens | 252/429 B |
| 4,263,169 | 4/1981 | Scata et al. | 252/429 B |
| 4,265,785 | 5/1981 | Giannini et al. | 252/429 B |

*Primary Examiner*—John F. Niebling
*Attorney, Agent, or Firm*—Henry Z. Friedlander

[57] ABSTRACT

A process for preparing an effective support for the titanium halide component of a coordinate complex catalyst for the polymerization of alpha-olefins comprises the steps of:
(a) intimately contacting a magnesium or manganese chloride or bromide with a drying agent at an elevated temperature,
(b) milling the magnesium or manganese chloride or bromide so as to activate its surface; and
(c) repeat contacting step (a) and milling step (b) for two or more cycles, whereby the effective support is produced.

20 Claims, No Drawings

METHOD FOR PREPARING A MAGNESIUM HALIDE SUPPORT FOR CATALYSTS

BACKGROUND OF THE INVENTION

This invention relates to the preparation of a magnesium halide support for catalysts. More specifically it relates to activating the surface of a magnesium halide support for the titanium halide component of coordinate complex catalysts for the polymerization of alpha-olefins.

There are three modes for the polymerization of olefins such as ethylene, propylene, butylene, butadiene, and other olefins containing up to twelve carbon atoms. The three general modes for polymerization of olefins employ either free radical, ionic, or coordinate complex catalysts. The coordinate complex catalysts are often termed Ziegler-Natta catalysts in honor of the two scientists who made major contributions to their development. Coordinate complex catalysts have two components, one based on organometallic compounds of Groups I, II, and III, often of aluminum, the other based on a transition metal salt such as titanium halide.

It has been found advantageous to support the titanium halide component on a magnesium halide or manganese halide support, as disclosed in U.S. Pat. No. 3,642,746 granted to Kashiwa et al. Further, it has been disclosed that the magnesium halide or manganese halide supports can be activated by being prepared with a high surface area by precipitation or evaporation from organic solvents, by milling the surface, or by activation with an organoaluminum compound. Of these methods U.S. Pat. No. 4,156,063 granted to Giannini et al. discloses that milling is preferred.

A criterion for the activation of magnesium halide or manganese halide supports is provided in U.S. Pat. No. 3,789,036 granted to Longi et al. In that patent the disclosure is made that milling to the point that the sharp X-ray diffraction line at $d=2.56$ Å (now known to be 2.57 Å) for dehydrated samples of magnesium halide is broadened to a diffuse halo, indicates the proper level of activation.

U.S. Pat. No. 4,149,990 granted to Giannini et al. discloses that for rhombohedral magnesium chloride the X-ray diffraction line at $d=2.56$ Å (sic) should be broadened to disappearance and for hexagonal magnesium chloride the X-ray diffraction line at $d=2.75$ Å should be broadened to disappearance and for magnesium bromide the X-ray line at $d=2.93$ Å should form a halo.

U.S. Pat. No. 4,064,334 granted to Kuroda et al. discloses that copulverizing magnesium halide with various organoaluminum compounds and titanium compounds and mixtures thereof provides a superior support for the coordinate complex catalysts for the polymerization and copolymerization of olefins.

U.S. Pat. No. 3,991,260 granted to Matsuura et al. discloses a process for polymerization of ethylene by a catalyst supported on a hydrous magnesium halide copulverized with various additives.

The methods disclosed above and many other similar published ones all involve copulverization or milling of the magnesium halide with one or more complex chemicals. It would be highly advantageous to be able to produce the support with an activated surface without the necessity of employing complex chemical additives when milling a support material.

It is an object of the present invention to prepare an anhydrous magnesium halide or manganese halide support for catalyst components containing titanium halide. It is a further object of this invention to provide an anhydrous magnesium halide or manganese halide support for catalysts with an activated surface. Still another object of the present invention is to provide an activated, anhydrous magnesium halide or manganese halide support for catalyst components containing titanium halide without the necessity of copulverization with organometallic additives. Other objects of the invention will be evident to those skilled in the art of catalytic polymerization from the description and Examples below.

SUMMARY OF THE INVENTION

Surprisingly, it has been found that drying the solid magnesium halide or manganese halide support material with a chemical drying agent, such as hydrogen chloride, at an elevated temperature followed by milling is efficacious in providing a support material with the proper activity. Furthermore, the drying and milling steps are repeated in cycles several times. Simultaneous drying and milling is also efficacious in carrying out the process of the instant invention.

DETAILED DESCRIPTION OF THE INVENTION

Hitherto, it has been recognized by those skilled in the art that magnesium halides, as well as other divalent halides such as manganese halides, cobaltous halides, and zinc halides, are suitable supports for the titanium component of coordinate complex catalysts. There is no clear teaching, however, as to the state of the hydration of the support. On the one hand the Longi et al. patent from the Montecatini group mentioned above teaches that dehydration of magnesium chloride, magnesium bromide, manganese halide, or calcium halide should be carried out until specific X-ray diffraction lines ascribable to a certain spacing in the unit cell are broadened. To carry out this dehydration various chemical and physical treatments are proposed without a specific teaching. Thereafter the Longi et al. disclosure teaches several alternative methods of activating the anhydrous surface among which is "very fine grinding". Both the dehydration and grinding steps in the Longi et al. disclosure can be carried out in the presence of various organometallic compounds or mixtures. On the other hand disclosures from the same Montecatini group teach that the proper starting material for activating magnesium halides or other halides should specifically be hydrated. Among the teachings are U.S. Pat. Nos. 3,803,105 granted to Galli et al. and 3,830,787 to Susa et al.

The support material of the present invention may be magnesium chloride, magnesium bromide, manganese chloride, manganese bromide, or mixtures of these halides. The starting support material may contain magnesium oxide or manganese oxide, as long as some halide is also present.

The preferred drying agents are those which maintain a halide surface or convert an oxide surface to a halide surface. Such halide drying agents include hydrogen chloride, hydrogen bromide, chlorine, bromine, phosgene, thionyl chloride, phosphorus trichloride, phosphorus oxychloride, and phosphorus tribromide. Among these drying agents hydrogen chloride is preferred. Sulfur dioxide or sulfur trioxide may also be useful as drying agents for the supporting material.

The magnesium halide or manganese halide support for the component of a coordinate complex catalyst containing titanium may have a final water analysis from about 0.01 percent to about 0.5 percent water by weight.

The temperature for the dehydration step may range from about 200° to about 650° C. Below 200° C. the dehydration takes an inordinate length of time. Dehydration above 650° C. risks melting the support material e.g., magnesium chloride has a melting point of 712° C. The preferred range for the temperature of dehydration is from about 300° to about 350° C.

The dehydration may take place in any type of furnace, hot tube, or reaction chamber. A continuously flushing, dry atmosphere is preferred. In order to decrease the pressure drop of a dehydrating bed of particles, glass, metal or ceramic balls or other shapes may be included as packing in the bed with the powdered support material being dehydrated. The weight of the packing can vary from about 10 to about 500 percent by weight of the fine powder of metallic halide being dehydrated.

Gaseous dehydrating agents, acting for about one hour or more at elevated temperature, are preferred.

The milling or pulverizing step is preferably performed in the substantial absence of oxygen and water using for example, a ball mill, an impact mill, a vibratory mill, or any other convenient apparatus for mechanical milling. The milling time differs depending on the apparatus used and can range from about one hour to about ten days. Using a ball mill it has been found that from about two to about five days of milling is preferred.

As shown in the Examples below repeated cycling between dehydrating steps and milling steps is highly advantageous since the dehydration step dries the surface of the magnesium halide or manganese halide support and the milling step creates fresh surfaces. There is no reason why the dehydration step and milling step could not be carried out simultaneously except for the practical difficulty of providing the milling apparatus with a means for heating it and its contents to a temperature of from about 200° to about 650° C. Simultaneous dehydration with a halogen-containing dehydration reagent and milling would be highly advantageous.

Having described the parameters of the present invention above, the Examples below illustrate the invention without limiting the scope of the instant disclosure.

EXAMPLE 1

Example 1 illustrates the method of the present invention.

An annealed glass tube 25 cm long and 5 cm in diameter equipped with a heating tape and thermometer was packed with 350 g of magnesium chloride (Alfa Inorganics, Danvers, Mass.) containing 2-3 weight percent water and 350 g of glass beads, 3 mm in diameter. The tube was flushed with dry nitrogen for five minutes and then heated to 200° C. by means of the electrical heating tape.

When the temperature in the tube had reached 200° C., hydrogen chloride gas was passed over and through the magnesium chloride and packing at a rate of 30 g/hr. Heating was continued until the temperature reached 325° C. and maintained at that temperature for four hours with the continuation of hydrogen chloride treatment. Then the tube was allowed to cool under nitrogen.

With the exclusion of air the contents of the tube were screened in a dry box with a 40-mesh screen. Then the dehydrated magnesium chloride was placed in a 6-1 stainless steel jar along with 7 kg of stainless steel balls, 15 mm in diameter. The jar mill was sealed and placed on a roller bed where it was milled for five days. After milling, the dehydrated milled halide was isolated from the milling balls and weighed. The yield was 325 g. This dehydrated activated sample of magnesium chloride was found to have 0.50 weight percent water.

EXAMPLE 2

This Example illustrates use of the activated magnesium chloride of Example 1 as a support for the titanium component of a coordinate complex polymerization catalyst system.

A 1-1 ball mill was charged with 40 g of the activated magnesium chloride of Example 1, 11 g of a titanium tetrachloride/ethyl benzoate "salt" and 875 g of stainless steel balls 9 mm in diameter. The ball mill was sealed in a dry box, and the reactants milled at ambient temperature for two days. The mill was then opened in the dry box and the product sieved. The yield was 45 g.

The supported titanium component of a coordinate complex polymerization catalyst made in the preceeding paragraph was tested under the following conditions:

A 4-liter reactor was charged with 2 l heptane, 8 mmoles triethylaluminum, 50 mg of the supported titanium component, and 10 atmospheres propylene. The polymerization was carried out with agitation for 90 minutes at 65° C. The polymer was isolated from the reaction mixture, washed and dried.

In like manner a control polymerization was carried out employing a titanium halide component supported by commercial, particulate magnesium chloride milled for five days. The results were as follows:

|  | % Water by wgt. | Activity g polymer/ g catalyst | Isotactic Index |
|---|---|---|---|
| MgCl$_2$ Control | 2.2 | 3349 | 35 |
| MgCl$_2$ of the present invention-one pass | 0.50 | 6052 | (34) |

The "Activity" number measures the activity of the catalyst preparation by giving the total weight of polymer produced for each gram of catalyst. A high activity is good because it means minimal metallic "ash" in the polymer.

The Isotactic Index (II) is a measure of the stereoregularity of the polymer produced. Three fractions of polymer result:

(a) polymer soluble in the polymerization solvent, (b) polymer insoluble in the polymerization mixture which is separated and dried at 70° C., and (c) dried polymer which is insoluble after three hours extraction in refluxing heptane, C$_7$ percent.

The II is given by the expression:

$$II = \frac{(\text{percent C}_7) \cdot (\text{weight of dried isolated polymer})}{(\text{total weight of all polymer produced})}$$

EXAMPLE 3

This Example illustrates the results achieved when more than one cycle of dehydration and milling of the present invention is carried out.

The procedure of Example 1 was repeated on part of the product of Example 1 to yield a support which had been dehydrated and milled twice. The magnesium halide was used to support the titanium component of a coordinate complex polymerization catalyst system as in Example 2.

The procedure of Example 1 was repeated again on part of the sample of the preceeding paragraph to yield a magnesium chloride support which has been dehydrated and milled three times. As in Example 2 this support was employed in the titanium halide component of a coordinate complex polymerization system.

A comparative sample was prepared for the product of three dehydration—milling cycles of the preceeding paragraph by dehydrating a sample of magnesium chloride once and then milling it for 15 days. This procedure matches the total milling time of the sample which had been processed through three cycles, but omits the cycles of the present invention. This sample was also tested as in Example 2.

The results for the above samples were as follows:

| $MgCl_2$ Treatment | % Water by wgt. | Activity g polymer/ g catalyst | Isotactic Index |
|---|---|---|---|
| Two cycles of the present invention | 0.38 | 6511 | 32 |
| Three cycles of the present invention | 0.25 | 7101 | 31 |
| 15 days milling, but without cycling | 0.44 | 4928 | 38 |

EXAMPLE 4

This Example illustrates the simultaneous carrying out of both the dehydration and milling steps of the present invention.

A liter stainless steel flask is charged with 300 g of magnesium chloride (Alfa) and 500 g of stainless steel balls 9 mm in diameter and attached to the inlet end of a laboratory rotary evaporator. After five minutes of flushing with dry nitrogen, the charged flask is rotated at about 10 rpm in an oil bath heated to 250° C. While the mixture is being milled, hydrogen chloride is passed over the charge at about 10 g/hr for 4 hours at 250° C. The vessel is then cooled under nitrogen.

The milled dehydrated product is emptied from the flask and sieved in a dry box.

The sample is tested, as in Example 2, to give an activity of 6500 and an Isotactic Index of 35.

The Examples above illustrate the present invention. Similar and obvious variations of these Examples will be evident to those skilled in the art, but this will not detract from the scope of legal protection sought in the claims below.

We claim:

1. A process for preparing an effective support for the titanium halide component of a coordinate complex catalyst for the polymerization of alpha-olefins comprising the steps of:
   (a) intimately contacting a magnesium or manganese chloride or bromide with a drying agent at an elevated temperature,
   (b) milling the magnesium or manganese chloride or bromide so as to activate its surface; and
   (c) repeat contacting step (a) and milling step (b) for two or more cycles, whereby the effective support is produced.

2. The process of claim 1 wherein the support is magnesium chloride.

3. The process of claim 1 wherein the support is manganese chloride.

4. The process of claim 1 wherein the elevated temperature is from about 200° to about 650° C.

5. The process of claim 1 wherein the elevated temperature is from about 300° to about 350° C.

6. The process of claim 1 wherein the alpha-olefin is selected from the group consisting of ethylene, propylene, 1,3-butadiene, and butene-1.

7. The process of claim 1 wherein the drying agent is selected from the group consisting of hydrogen chloride, hydrogen bromide, chlorine, phosgene, bromine, thionyl chloride, phosphorus trichloride, phosphorus oxychloride, and phosphorus tribomide.

8. The process of claim 1 wherein the drying agent is hydrogen chloride.

9. The process of claim 1 wherein contacting step (a) and milling step (b) are carried out simultaneously.

10. The process of claim 1 wherein the repetition of steps (a) and (b) is carried out two more times.

11. The process of claim 1 wherein the repetition of steps (a) and (b) is carried out three or more times.

12. A magnesium or manganese chloride or bromide for use as a support for the titanium component of a coordinate complex catalyst for the polymerization of alpha-olefins obtained by:
   (a) intimately contacting said chloride or bromide with a drying agent at an elevated temperature,
   (b) milling the magnesium or manganese chloride or bromide so as to activate its surface, and
   (c) repeating contacting step (a) and milling step (b) for two or more cycles.

13. The catalytic support of claim 12 in the form of magnesium chloride.

14. The catalytic support of claim 12 in the form of manganese chloride.

15. A catalytic component containing titanium for the coordinate complex catalysis of the polymerization of an alpha-olefin supported by a magnesium or manganese chloride or bromide obtained by:
   (a) intimately contacting said chloride or bromide with a drying agent at an elevated temperature,
   (b) milling the magnesium or manganese chloride or bromide so as to activate its surface, and
   (c) repeating contacting step (a) and milling step (b) for two or more cycles.

16. The component of claim 15 in the form of magnesium chloride.

17. The component of claim 15 in the form of manganese chloride.

18. A process for the coordinate complex polymerization of an alpha-olefin or mixtures thereof comprising use of the component containing titanium recited in claim 15, 16 or 17.

19. The process of claim 18 wherein the alpha-olefin is propylene.

20. The process of claim 18 wherein the alpha-olefin is ethylene.

* * * * *

UNITED STATES PATENT AND TRADEMARK OFFICE
CERTIFICATE OF CORRECTION

PATENT NO. : 4,350,612
DATED : September 21, 1982
INVENTOR(S) : Carl C. Greco et al.

It is certified that error appears in the above-identified patent and that said Letters Patent are hereby corrected as shown below:

Col. 6, line 23

"tribomide" should be -- tribromide --.

Signed and Sealed this

Eleventh Day of January 1983

[SEAL]

Attest:

GERALD J MOSSINGHOFF

Attesting Officer     Commissioner of Patents and Trademarks